United States Patent
Andrasic et al.

(10) Patent No.: US 7,097,221 B2
(45) Date of Patent: Aug. 29, 2006

(54) BUMPER HAVING A ROLL-FORMED RIDGE

(75) Inventors: Sinisa Andrasic, Kitchener (CA); Uwe Krempels, Boeblingen (DE); Maya Ziegs, Ammerbuch (DE); Stefan Zwiener, Neuhausen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/810,115

(22) Filed: Mar. 26, 2004

(65) Prior Publication Data

US 2005/0093308 A1 May 5, 2005

(30) Foreign Application Priority Data

Mar. 28, 2003 (DE) ................ 103 14 021

(51) Int. Cl.
*B60R 19/00* (2006.01)

(52) U.S. Cl. ...................... 293/102; 293/120
(58) Field of Classification Search ........... 293/102, 293/120, 142, 143, 144, 155, 136
See application file for complete search history.

(56) References Cited

U.S. PATENT DOCUMENTS

| | | | | |
|---|---|---|---|---|
| 4,116,480 A | * | 9/1978 | Crestetto | 293/102 |
| 4,160,562 A | * | 7/1979 | Crestetto | 293/120 |
| 4,252,355 A | * | 2/1981 | Goupy et al. | 293/120 |
| 4,385,779 A | * | 5/1983 | Kimura et al. | 293/102 |
| 4,721,333 A | * | 1/1988 | Morio | 293/146 |
| 5,507,540 A | * | 4/1996 | Pernot | 293/102 |
| 5,609,374 A | * | 3/1997 | Sawae et al. | 293/102 |
| 5,688,006 A | | 11/1997 | Bladow et al. | |
| 6,846,026 B1 | * | 1/2005 | Detwiler et al. | 293/102 |
| 2002/0180222 A1 | * | 12/2002 | Janssen | 293/102 |
| 2003/0227184 A1 | * | 12/2003 | Evans | 293/120 |
| 2004/0135384 A1 | * | 7/2004 | Pritchard et al. | 293/120 |

FOREIGN PATENT DOCUMENTS

| | | |
|---|---|---|
| DE | 29 19 046 | 11/1980 |
| DE | 94 02 167 | 6/1994 |
| DE | 696 04 108 | 1/2000 |
| DE | 102 60 342 | 8/2003 |
| JP | 62-12443 | 1/1987 |
| JP | 08192698 A * | 7/1996 |
| JP | 2003312399 A * | 11/2003 |

* cited by examiner

*Primary Examiner*—Joseph D. Pape
(74) *Attorney, Agent, or Firm*—Kenyon & Kenyon LLP

(57) ABSTRACT

A bumper for a motor vehicle includes an outer bumper part and an inner bumper part. Inner bumper part includes a base part and at least one side crosspiece situated at an angle thereto. Repair costs, e.g., in response to collisions at low speeds, may be reduced. For this purpose, the region of the transition from base part to side crosspiece is designed so that when a force is applied to the bumper, the deformation of the inner bumper part takes place in a predetermined direction.

9 Claims, 2 Drawing Sheets

BUMPER HAVING A ROLL-FORMED RIDGE

CROSS-REFERENCE TO RELATED APPLICATIONS

The present application claims priority to Application No. 103 14 021.2, filed in the Federal Republic of Germany on Mar. 28, 2003, which is expressly incorporated herein in its entirety by reference thereto.

FIELD OF THE INVENTION

The present invention relates to a bumper for a motor vehicle.

BACKGROUND INFORMATION

German Published Patent Application No. 29 19 046 describes a bumper system which has an outer bumper part and an inner bumper part. The inner bumper part has a base part as well as two side crosspieces positioned to it at an angle. The base part of the inner bumper part is furnished with three ridges for reinforcement, running lengthways. The ridges contribute to the optimization of the loading capacity of the bumper system.

A bumper having an outer bumper part as well as an inner bumper part is described in German Published Patent Application No. 102 60 342, the inner bumper part having a base part and at least one side crosspiece situated at an angle thereto. The inner bumper part is designed so that when a force is applied to the bumper, the deformation of the inner bumper part takes place in a defined fashion.

German Published Utility Model No. 94 02 167 U describes a bumper having an inner bumper part as well as an outer bumper part. The inner bumper part is developed as at least one rib or brace.

It is an aspect of the present invention to provide a bumper, by which repair costs may be reduced, e.g., in the case of collisions occurring at low speeds.

SUMMARY

The above and other beneficial aspects of the present invention may be achieved by providing a bumper as described herein.

According to an example embodiment of the present invention, a bumper includes an inner bumper part having a base part and a side crosspiece positioned to the latter at an angle, and the inner bumper part is constructively designed such that, in the case of a collision, the deformation of the inner bumper part takes place in a predetermined direction. In other words, the inner bumper part is constructed such that the direction of deformation is purposefully influenced in the case of a force being applied to the bumper. The direction of deformation may be selected such that component parts positioned directly in the vicinity of the bumper are not touched by it during a deformation of the bumper. Thus, in response to a collision, such as a collision at low speed, during which the crash force is only introduced into the bumper, the bumper may be deformed such that component parts positioned in the direct vicinity may not be touched, and consequently may not be damaged. This may limit repair work to just the bumper itself, and not to component parts that are positioned round about it, whereby repair costs may be considerably reduced.

If a ridge is provided, in the region of the transition from the base part to the side crosspiece, that is directed inwards, i.e., in the direction of the motor vehicle, the direction of deformation of the bumper is influenced such that arching upwards or breaking away of the bumper's inner part may be minimized. Rather, a ridge formed in that manner may impose a motion directed inwards on the bumper's inner part, for instance, a rolling-in motion. The ridge initiates a rolling-in motion of the bumper's inner part. Consequently, bulging of the bumper, and, because of that, damage to component parts that are positioned in the direct vicinity of the bumper, such as a hatchback, may be prevented. Depending on the alignment of the ridge, it may be possible to influence the direction of deformation. It is possible that the ridge might point in the intended direction of deformation. The ridge may be able to assume the most varied shapes, as seen in cross-section. It is possible that one may provide the ridge to be triangular in cross-section. However, it is also possible that the ridge may have an elliptically-shaped or parallelogram-shaped cross-section. The corner regions of the ridge may be designed to be rounded in all cross-sectional shapes. The inner part of the bumper may have two side crosspieces which are also aligned parallel to one another, so that the inner part of the bumper is U-shaped in cross-section. The base part and the side crosspieces may be designed as one part or several parts. The inner part of the bumper may develop the best effect if the side crosspieces are aligned essentially horizontally in installation position, and the base part points away from the vehicle, i.e., in the direction of a possible impact.

The transition from the base part to the side crosspieces may take place over a radius. That is, there may be no right angled transition. Such a radius may make possible a yielding deformation of the inner part of the bumper and may prevent interlocking of the latter upon the initiation of an impact force.

If the ridge is situated in the region of the radius, the direction of deformation of the inner part of the bumper upon the initiation of an impact force may be determined particularly well ahead of time.

The ridge may extend over the entire width of the inner part of the bumper, i.e., essentially horizontally along the radius, between the base part and the side crosspiece. This may provide that the effect described herein may take place independently of the location of the introduction of the force. That means, that no matter at which place a collision takes place, the arching upwards of the bumper may be prevented, and the inner part may execute a motion directed inwardly. However, it is also possible to mount the ridge only in regions in which there are neighboring component parts, which one wishes to protect from damage in case of an accident. It is possible to provide the ridge only where, for example, a hatchback borders on a bumper. The ridge may also be provided in the bordering area of all other component parts.

According to an example embodiment of the present invention, a bumper for a motor vehicle includes an outer bumper part, and an inner bumper part including a base part and at least one side crosspiece positioned at an angle to the base part, regions of a transition from the base part to the side crosspiece configured so that deformation of the inner bumper part occurs in a predetermined direction in response to a force applied to the bumper, the region of the transition from the base part to the side crosspiece including a ridge pointing in a desired direction of deformation.

The ridge may include a triangular cross-section.

The inner bumper part may include two side crosspieces.

The side crosspieces may be aligned parallel to each other.

The side crosspieces are may be aligned substantially horizontal in an installed state.

The transition from the base part to at least one side crosspiece may include a radius.

The ridge may be arranged in a region of the radius.

The ridge may extend over a substantial part of a width of the inner bumper part.

According to an example embodiment of the present invention, a bumper for a motor vehicle includes outer bumper part means, and inner bumper part means including base part means and side crosspiece means positioned at an angle to the base part means, the inner bumper part means including means in regions of a transition from the base part means to the side crosspiece means for deforming the inner bumper part means in a predetermined direction in response to a force applied to the bumper, the deforming means including ridge means pointing in a desired direction of deformation.

Additional features and aspects of the device according to example embodiments of the present invention are described below with reference to the appended Figures.

DETAILED DESCRIPTION

Figure 1:
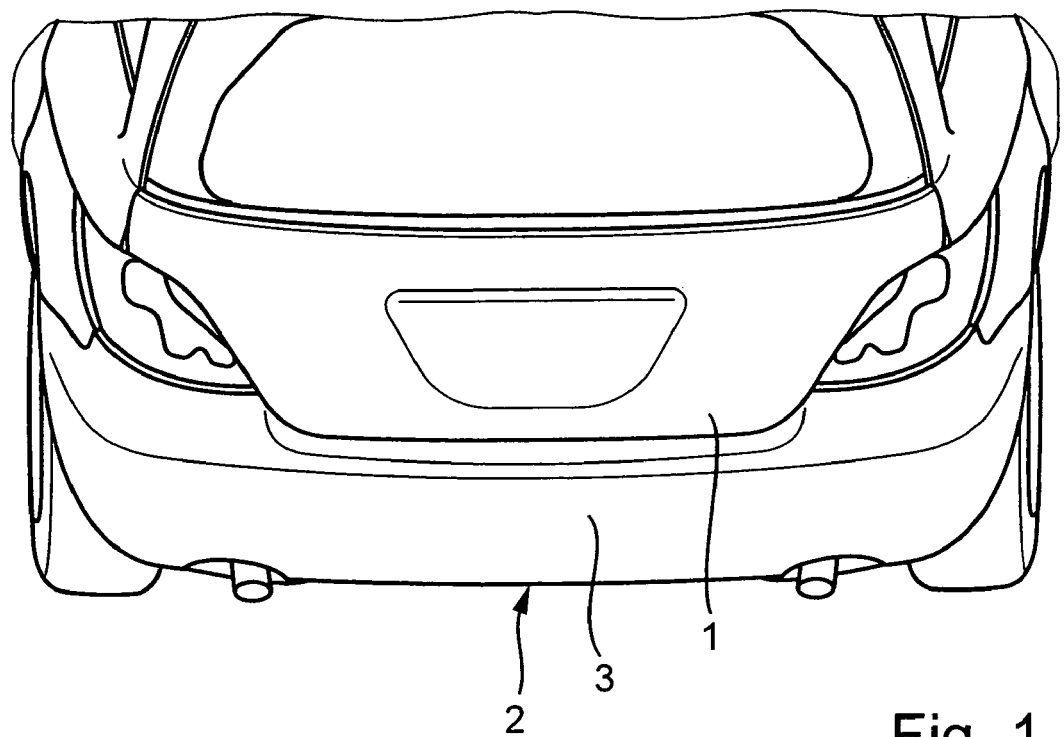
FIG. 1 is a perspective view of a rear region of a motor vehicle, having a hatchback and a bumper.

FIG. 1 shows the rear part of a motor vehicle. It has a hatchback 1 as well as a bumper 2. One may recognize outer bumper part 3 of bumper 2, which covers structures lying below it as a sort of fascia, and takes care of presenting an optically attractive appearance towards the outside. In the case of the vehicle shown, hatchback 1 is pulled down. So that it ends directly above bumper 2.

Figure 2:
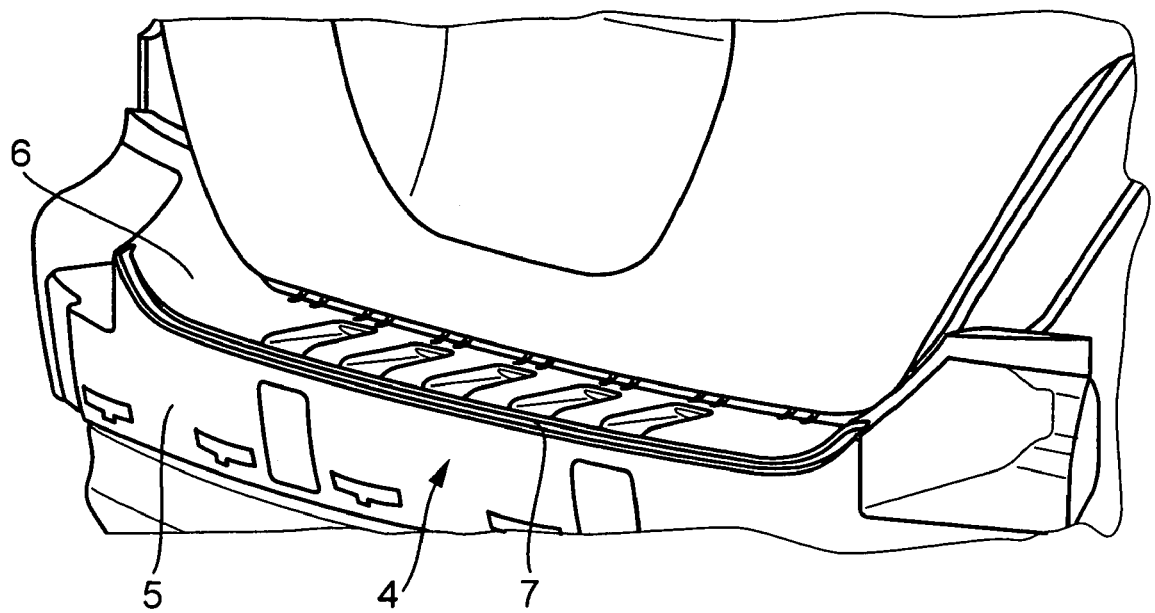
FIG. 2 is a a perspective view of the rear region illustrated in FIG. 1, having an inner part of a bumper and a hatchback.

In FIG. 2, the rear of the motor vehicle is shown without the outer bumper part 3, so that structures lying below it, especially inner bumper part 4, are visible. In the exemplary embodiment shown, inner bumper part 4 is a plastic part and extends over the entire width of the vehicle, just as outer bumper part 3 does. It has a base part 5, which is planar and essentially vertically aligned. Base part 5 is connected to side crosspiece 6, which is essentially horizontally aligned. Side crosspiece 6 points in the direction of the vehicle, and is connected to base part 5 via a radius. In this connection, radius represents that the transition of base part 5 and side crosspiece 6 is not a right angle but follows a rounded course. Hatchback 1 joins in above side crosspiece 6. Recesses have been put into side crosspiece 6. Outer bumper part 3 is connected to inner bumper part 4 via these recesses. Side crosspiece 6 is designed to be so rigid that it may carry a certain load, and consequently it may be used as an extension of the loading surface of the motor vehicle. Base part 5 and side crosspiece 6 are used, in this context, as support for outer bumper part 3.

Figure 3:
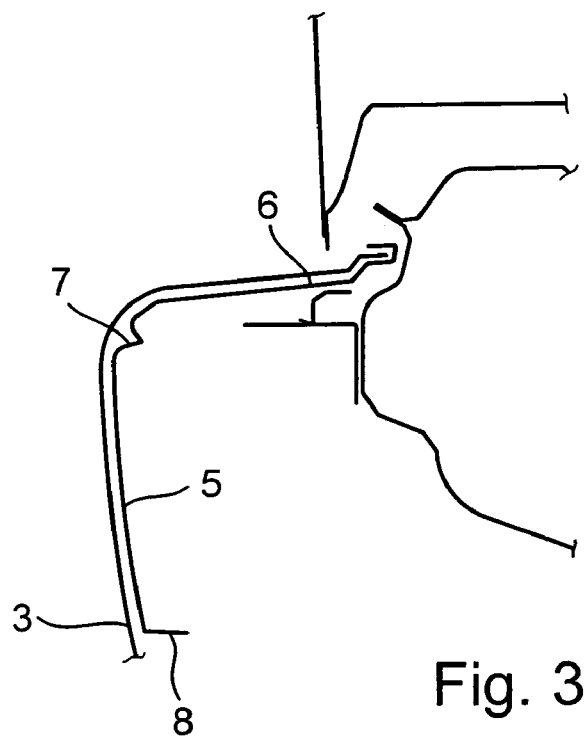
FIG. 3 is a cross-sectional view through an undeformed rear region of a motor vehicle having a bumper.

In the region of the transition of base part 5 and side crosspiece 6, a ridge 7 is applied to inner bumper part 4. As may be seen in FIG. 3, ridge 7 faces inwardly, i.e., in the direction of the vehicle. Its sides, proceeding from the rounded transition between base part 5 and side crosspiece 6, come to a point. Consequently, the cross-section of ridge 7 is approximately triangular. Ridge 7 extends over a substantial portion of the width of the vehicle, and actually the part on which hatchback 1 borders. It is also possible that ridge 7 extends over the entire width of the vehicle, or is only provided in the regions of inner bumper part 4 which border on the component parts to be protected. In FIG. 3 one may also see that inner bumper part 4 has an additional side crosspiece 8, which is connected to the end of base part 5 that points downwardly. It is substantially aligned horizontally, just as the upper side crosspiece 6.

Figure 4:
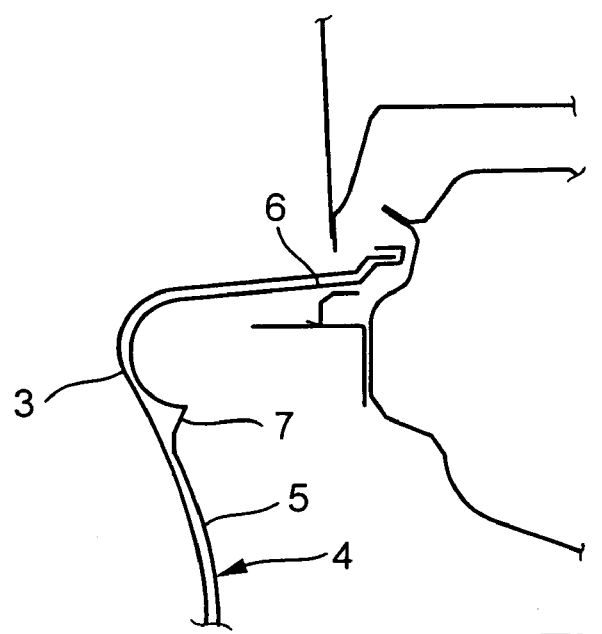
FIG. 4 is a cross-sectional view through a deformed rear region of a motor vehicle having a bumper.

FIG. 4 shows the rear of the vehicle after an impact. The impact has occurred at low speed, so that the force of the impact was introduced essentially into bumper 2 and a girder subject to bending, and not into other component parts of the motor vehicle. Because of the introduction of force, both outer bumper part 3 and inner bumper part 4 have been deformed. Because of ridge 7, inner bumper part 4 has been deformed towards the inside, i.e., in the direction of the vehicle. The round transition between base part 5 and side crosspiece 6 has rolled in the direction of the sides of ridge 7 coming to a point. Inner bumper part 4 has carried the outer bumper part with it. Because ridge 7 points essentially towards inside bottom, the bumper has not broken away upwardly during the deformation, but has been deformed toward the inside, downwardly. Consequently, component parts lying above the bumper, such as hatchback 1, have not been touched during the deformation and have not been damaged. A repair is able to limit itself only to the bumper. Other component parts have not been acted upon by the impact.

What is claimed is:

1. A bumper for a motor vehicle, comprising:
   an outer bumper part; and
   an inner bumper part including a base part and at least one side crosspiece positioned at an angle to the base part, regions of a transition from the base part to the side crosspiece configured so that deformation of the inner bumper part occurs in a predetermined direction in response to a force applied to the bumper, the region of the transition from the base part to the side crosspiece including a ridge pointing in a desired direction of deformation,
   wherein the outer bumper part is connected to the inner bumper part, and
   wherein the ridge is located at an upper portion of the inner bumper part.

2. The bumper according to claim 1, wherein the ridge has a triangular cross-section.

3. The bumper according to claim 1, wherein the inner bumper part includes two side crosspieces.

4. The bumper according to claim 3, wherein the side crosspieces are aligned parallel to each other.

5. The bumper according to claim 3, wherein the side crosspieces are aligned substantially horizontal in an installed state.

6. The bumper according to claim 1, wherein the transition from the base part to at least one side crosspiece includes a radius.

7. The bumper according to claim 6, wherein the ridge is arranged in a region of the radius.

8. The bumper according to claim 1, wherein the ridge extends over a substantial part of a width of the inner bumper part.

9. A bumper for a motor vehicle, comprising:
outer bumper part means; and
inner bumper part means including base part means and side crosspiece means positioned at an angle to the base part means, the inner bumper part means including means in regions of a transition from the base part means to the side crosspiece means for deforming the inner bumper part means in a predetermined direction in response to a force applied to the bumper, the deforming means including ridge means pointing in a desired direction of deformation,
wherein the outer bumper part means is connected to the inner bumper part means, and
wherein the ridge means is located at an upper portion of the inner bumper part means.

* * * * *